(12) United States Patent
Pronin et al.

(10) Patent No.: US 11,552,442 B2
(45) Date of Patent: Jan. 10, 2023

(54) DEVICE AND METHOD FOR GENERATING LASER PULSES BY KERR LENS BASED MODE LOCKING WITH A LOSS-MODULATION DEVICE AS A KERR MEDIUM

(71) Applicants: Max-Planck-Gesellschaft zur Foerderung der Wissenschaften e.V., Munich (DE); Ludwig-Maximilians-Universitaet Muenchen, Munich (DE)

(72) Inventors: Oleg Pronin, Hamburg (DE); Ferenc Krausz, Garching (DE); Sebastian Groebmeyer, Holzkirchen (DE); Jonathan Brons, Oberndorf (DE)

(73) Assignees: MAX-PLANCK-GESELLSCHAFT ZUR FOERDERUNG DER WISSENSCHAFTEN E.V., Munich (DE); LUDWIG-MAXIMILIANS-UNIVERSITAET MUENCHEN, Munich (DE)

( * ) Notice: Subject to any disclaimer, the term of this patent is extended or adjusted under 35 U.S.C. 154(b) by 253 days.

(21) Appl. No.: 16/964,462

(22) PCT Filed: Jan. 23, 2019

(86) PCT No.: PCT/EP2019/051560
§ 371 (c)(1),
(2) Date: Jul. 23, 2020

(87) PCT Pub. No.: WO2019/145322
PCT Pub. Date: Aug. 1, 2019

(65) Prior Publication Data
US 2021/0050701 A1 Feb. 18, 2021

(30) Foreign Application Priority Data

Jan. 25, 2018 (EP) ..................... 18153450

(51) Int. Cl.
*H01S 3/11* (2006.01)
*H01S 3/06* (2006.01)
(Continued)

(52) U.S. Cl.
CPC .......... *H01S 3/1112* (2013.01); *H01S 3/0604* (2013.01); *H01S 3/0813* (2013.01);
(Continued)

(58) Field of Classification Search
CPC ...... H01S 3/1068; H01S 3/136; H01S 3/1307; H01S 3/107; H01S 3/1112; G02F 1/0154; G02F 1/03; G02F 1/3511; G02F 1/0327
See application file for complete search history.

(56) References Cited

U.S. PATENT DOCUMENTS 5,450,427 A 9/1995 Fermann et al.
7,474,457 B2 1/2009 Krausz et al.
(Continued)

FOREIGN PATENT DOCUMENTS

| CN | 113346339 | * | 9/2021 | .......... H01S 3/0623 |
| WO | WO 94/10729 | | 5/1994 | |
| WO | WO2020192887 | * | 10/2020 | ............. H01S 3/105 |

OTHER PUBLICATIONS

Jinwei Zhang et al. "49-fs Yb:YAG thin-disk oscillator with distributed Kerr-lens mode-locking" 2015 European Conference on Lasers and Electro-Optics—European Quantum Electronics Conference (Optica Publishing Group, 2015), p. 1 (Year: 2015).*
(Continued)

*Primary Examiner* — Tod T Van Roy
*Assistant Examiner* — Delma R Fordé
(74) *Attorney, Agent, or Firm* — Caesar Rivise, PC

(57) ABSTRACT

A laser device (100), being configured for generating laser pulses by Ken lens based mode locking, comprises a laser resonator (10) with a plurality of resonator mirrors (11.1,
(Continued)

11.2, 11.3) spanning a resonator beam path (12), a solid state gain medium (20) being arranged in the laser resonator (10), a Kerr medium device (30) being arranged with a distance from the gain medium (20) in the laser resonator (10), wherein the Kerr medium device (30) includes at least one Ken medium being arranged in a focal range of the resonator beam path and being configured for forming the laser pulses by the nonlinear Kerr effect, and a loss-modulation device (31, 32) having a modulator medium, which is capable of modulating a power loss of the laser pulses generated in the laser resonator (10), wherein the Kerr medium device (30) includes the modulator medium of the loss-modulation device (31, 32) as the at least one Kerr medium having an optical non-linearity being adapted for both of creating the Kerr lens based mode-locking in the laser resonator and modulating the power loss in the laser resonator. Furthermore, a method of generating laser pulses by Kerr lens based mode locking is described, wherein a loss-modulation device (31, 32) is used for both of introducing a Ken effect in the laser resonator (10) and modulating the power loss.

27 Claims, 3 Drawing Sheets

(51) Int. Cl.
| | |
|---|---|
| H01S 3/081 | (2006.01) |
| H01S 3/107 | (2006.01) |
| H01S 3/13 | (2006.01) |
| H01S 3/136 | (2006.01) |

(52) U.S. Cl.
CPC ............ *H01S 3/107* (2013.01); *H01S 3/1307* (2013.01); *H01S 3/136* (2013.01)

(56) References Cited

U.S. PATENT DOCUMENTS

| | | | |
|---|---|---|---|
| 9,318,867 | B2 | 4/2016 | Pronin et al. |
| 10,855,049 | B2* | 12/2020 | Pronin ................. H01S 3/0816 |
| 2010/0085994 | A1* | 4/2010 | Resan ................. H01S 3/1112 372/25 |
| 2013/0329279 | A1 | 12/2013 | Nati et al. |
| 2016/0094008 | A1 | 3/2016 | Fermann et al. |
| 2016/0329677 | A1* | 11/2016 | Zhang ................. H01S 3/1068 |
| 2017/0264070 | A1 | 9/2017 | Cingoz et al. |

OTHER PUBLICATIONS

Jonathan Brons et al. "Energy scaling of Kerr-lens mode-locked thin-disk oscillators" Optics Letters vol. 39, No. 22, Nov. 15, 2014, pp. 6442-6445 (Year: 2014).*

International Search report for corresponding PCT Application No. PCT/EP2019/051560 dated Mar. 22, 2019.

Boyd et al., "Design Procedure for Wide Bandwidth Acousto-Optic Modulator", Optical Engineering, vol. 16, No. 5, pp. 452-454, Sep./Oct. 1977.

Brons et al., "Powerful 100-fs-scale Kerr-lens mode-locked thin-disk oscillator", Optics Letters, vol. 41, No. 15, pp. 3567-3570, Aug. 1, 2016.

Debnath et al., "Proposal for electro-optically tunable Kerr-Lens in BBO crystal by cascaded second-order process", Optik, vol. 138, pp. 256-262, 2017.

Fuji et al., Monolithic Carrier-Envelope Phase-Stabilization Scheme, Optics Letters, vol. 30., No. 3, pp. 332-334, Feb. 1, 2015.

Porta et al., "Environmentally Stable Picosecond Ytterbium Fiber Laser With a Broad Tuning Range", Optics Letters, vol. 23, No. 8, pp. 615-617, Apr. 15, 1998.

Pronin et al., "Power and Energy Scaling of Kerr-Lens Mode-Locked Thin-Disk Oscillators", Proceedings of SPIE, vol. 9135, pp. 91351H1-91351H5, 2014.

Pronin et al., "High-Power Multi-Megahertz Source of Waveform-Stabilized Few-Cycle Light", Nature Communications, vol. 6., No. 7988, pp. 1-6, 2015.

Ramaswamy et al., "Cavity-Dumped Femtosecond Kerr-Lens Mode-Locked Ti:Al2O3 Laser", Optics Letters, vol. 18, No. 21, pp. 1822-1824, Nov. 1, 1993.

Seidel et al., "Carrier-envelope-phase Stabilization via Dual Wavelength Pumping", Optics Letters, vol. 41, No. 8, pp. 1853-1856, 2016.

Tomie, T., "Picosecond Pulse Generation by Self-Phase Modulation in an Actively Mode-Locked and Q-Switched Phosphate Glass Laser", Japanese Journal of Applied Physics, pp. 1008-1017, Aug. 1985.

Wegner et al., "Characterization and Suppression of Self-Phase Modulation in a Commercial Modelocked and Q-Switched Nd:YLF Oscillator", Optics Communications, Elsevier, Amsterdam, NL, vol. 120, No. 5, pp. 358-368, Nov. 1995.

Zhang et al., "49-fs Yb:YAG Thin-Disk Oscillator with Distributed Kerr-Lens Mode-Locking", 2015 European Conference on Lasers and Electro-Optics, European Quantum Electronics Conference, Optical Society of America.

* cited by examiner

DEVICE AND METHOD FOR GENERATING LASER PULSES BY KERR LENS BASED MODE LOCKING WITH A LOSS-MODULATION DEVICE AS A KERR MEDIUM

CROSS-REFERENCE TO RELATED APPLICATIONS

This application is a U.S. National Phase Application under 35 U.S.C. § 371 of PCT/EP2019/051560, filed Jan. 23, 2019, which claims priority to European Patent Application No. 18153450.4 filed Jan. 25, 2018, the contents of which are incorporated herein by reference in their entirety.

FIELD OF THE INVENTION

The present invention relates to laser devices and methods for generating laser pulses by Kerr lens based mode locking. Applications of the invention are present in particular in all fields of employing laser pulses, in particular for measuring, sample excitation, data transmission and material processing purposes.

TECHNICAL BACKGROUND

In the present specification, reference is made to the following publications cited for illustrating prior art techniques, in particular with regard to loss modulation in laser oscillators and generating fs laser pulses by Kerr lens mode-locking:
[1] US 2016/0329677 A1;
[2] M. Seidel et al. in "Opt. Lett." 41, 1853-1856 (2016);
[3] O. Peonin et al. in "Nature Communications" 6, ncomms7988 (2015);
[4] R. Boyd et al. in "Optical Engineering" 16(5), 165452 (1977);
[5] J. Zhang et al. in "2015 European Conference on Lasers and Electro-Optics—European Quantum Electronics Conference, (Optical Society of America, 2015), PD_A_1;
[6] U.S. Pat. No. 9,318,867 B2;
[7] J. Brons et al. in "Opt. Lett." 41, 3567-3570 (2016);
[8] T. Fuji et al. in "Opt. Lett." 30, 332-334 (2005);
[9] U.S. Pat. No. 7,474,457 B2;
[10] T. Tomie in "Japanese Journal of Applied Physics" 24, 1008-1017 (1985);
[11] M. Ramaswamy et al. in "Optics Letters" 18, 1822-1824 (1993); and
[12] O. Pronin et al. in "Visual communications and image processing" 9135, 91351H-91351H (2014).

Generating fs laser pulses by Kerr lens mode-locking is generally known (see e. g. [1] and references cited therein). The carrier envelope offset (CEO) frequency of a mode-locked laser oscillator is sensitive to changes of oscillator parameters. Thus, the stabilization of the CEO can be realized by manipulating any of those parameters. In mode-locked solid-state oscillators, this is typically achieved by modulating the pump- or intra-cavity power by use of an acousto-optic modulator (AOM) while in fiber oscillators electro-optic modulators (EOMs) are used to serve the same purpose. Due to the strong amplitude to phase coupling in mode-locked fiber and solid-state oscillators, amplitude control works well for the CEO and/or intensity stabilization.

In general, the method utilized for controlling and/or stabilizing the CEO frequency and/or pulse intensity should fulfil the following two criteria:

a) Large modulation bandwidth, desirably several hundred kHz, and at least 30 kHz: the bandwidth is typically defined over a frequency range in which a 90° phase shift of the modulated quantity with respect to the AOM or EOM drive signal is accumulated. There should likewise be a substantial amplitude modulation of at least 0.05%, preferably showing a flat response up to this frequency.

b) Reasonable power scalability: the control mechanism should remain applicable without major modification independent of the intra-cavity peak- and average power level.

For modulating the pump power, the accessible modulation bandwidth of the stabilization scheme is typically limited by the coupling between gain and pulse energy which is determined by the upper-state lifetime of the gain medium. For most rare earth doped solid-state lasers, the modulation bandwidth is on the order of only several tens of kilohertz, although it might be shifted to higher frequencies by utilizing phase lead filters in the phase-locked loop (PLL) [2]. This limitation can be overcome by utilizing intra-cavity loss modulation instead of pump power modulation as it has successfully been demonstrated in [3]. However, placing the AOM inside the cavity might lead to additional self-focusing (Kerr lensing) inside the AOM which can counteract the main KLM mechanism and deteriorate the mode-locking performance. This becomes crucial especially when the concept is applied to high power lasers, since in this case the intra-cavity peak powers rise substantially and the contribution of the nonlinear refractive index becomes important even for large beam diameters. These nonlinear effects can be mitigated for example by increasing the spot-size inside the AOM, however, at the expense of an increased transit time which is linearly proportional to the beam radius. The transit time $\tau = 2\,w/V$, where w is the $1/e^2$ beam radius and V is the acoustic velocity in the modulator material, is an important parameter since it can be used to characterize the modulation bandwidth of the AOM which is defined as $\Delta f = (\delta \sqrt{\beta})/(\pi\tau)$ where $\delta$ is a constant equal to about 1.357 and $\beta$ is the fall-off in bandwidth expressed in decibel [4]. Consequently, at high powers, the large beam diameters which are required to maintain a low nonlinear phase-shift inside the AOM at the same time evoke longer transit times which inhibit the realization of large modulation bandwidths. The aforementioned approaches are therefore not capable of fulfilling both of the above criteria a) and b) simultaneously.

Mode-locked oscillators are known which have the Kerr medium decoupled from the gain medium section of the laser [6]. Therefore, the Kerr medium can be chosen to be any nonlinear medium. Since the beam is usually focused into the Kerr medium, the spot-size is small when compared to the collimated beam sections inside the oscillator. As a result, strong self-phase and self-amplitude modulation are introduced by the Kerr medium owing to the nonlinear Kerr effect. This nonlinear effect is responsible for the formation and stabilization of a soliton inside the cavity and makes mode-locked operation feasible.

Laser resonators with gain media based on the thin-disk geometry (TD lasers) are a highly attractive alternative to the most commonly utilized lasers based on gain media with a bulk geometry, of which Ti:Sa lasers are the most prominent example. While Ti:Sa lasers are able to generate pulses in the few-cycle regime directly from the laser oscillator, they usually require additional extra-cavity amplification of the pulse intensity for subsequent applications requiring frequency conversion. TD lasers are capable of generating significantly higher peak- and average powers directly from the oscillator and can therefore evade the need for extra-cavity pulse amplification. The feasibility of stabilizing the CEO frequency of Kerr lens mode-locked TD oscillators has been demonstrated, however at only moderate intra-cavity peak powers when compared to the available lasers [3, 7].

Publication [10] discloses an early technique of creating laser pulses by active mode-locking. According to [10], the pulse forming mechanism is relying on the action of a first AOM being operated at 50 MHz and combined with a second AOM. The second AOM acts as a Q-Switch to modulate the envelope of the pulse train. Stable mode locking is obtained only with the Q-switch in conjunction with the first AOM, but not by the Kerr-effect, which is used in [10] only for reducing the pulse duration from initially 40 ps to approximately 4 ps by self-phase modulation in combination with a discrimination of the etalon. The laser device disclosed in [10] can therefore not be considered to be generating pulses by Kerr lens based mode locking. In [11], a laser device is disclosed, which includes an AOM as well. In this case, the gain medium and the AOM are configured such that no significant Kerr-lensing effect can be obtained in the AOM due to the significantly smaller non-linear phase-shift accumulated in the AOM material when compared to the laser gain material. The same applies to [12], where an AOM is placed in the collimated arm of a resonator-, wherein no significant Kerr-lensing effect is provided by the AOM.

Objective of the Invention

The objective of the invention is to provide improved laser devices and methods for generating laser pulses by Kerr lens based mode locking, being capable of avoiding disadvantages of conventional techniques. In particular, the objective of the invention is to provide laser devices and methods employing Kerr lens based mode locking, wherein controlling and/or stabilizing the pulses in the laser oscillator by intra-cavity loss modulation is facilitated and especially both of an increased modulation bandwidth of intra-cavity loss modulation and power scalability of the control procedure are obtained.

SUMMARY OF THE INVENTION

The above objectives are solved with laser devices and methods for generating laser pulses by Kerr lens based mode locking comprising the features of one of the independent claims. Preferred embodiments and applications of the invention are defined in the dependent claims.

According to a first general aspect of the invention, the above objective is solved by a laser device, which is configured for generating laser pulses by Kerr lens based mode locking. The laser device comprises a laser resonator (laser oscillator) with a plurality of resonator mirrors spanning a resonator beam path. The resonator mirrors comprise plane and/or curved dielectric mirrors being arranged for providing a resonator design with a linear, folded or circular resonator beam path. The laser resonator includes a solid state gain medium. The gain medium is configured for creating a circulating laser light field in response to a pump (excitation) mechanism, including e. g. pumping with a separate pump laser. Furthermore, the laser resonator includes a Kerr medium device having at least one Kerr medium, which is configured for creating the laser pulses from the laser light field by the nonlinear Kerr effect, in particular for forming the laser pulses by a combination of self-focusing caused by the nonlinear Kerr-effect in conjunction with a soft- or hard-aperture inside the laser resonator. The at least one Kerr medium is arranged within the laser resonator in a focal range of the resonator beam path. Furthermore, the at least one Kerr medium is arranged with a distance from the gain medium, i. e. the at least one Kerr medium and the gain medium are separated from each other. The laser resonator further comprises a loss-modulation device (optical modulator device) having a modulation medium (modulator material, modulator component), which is capable of modulating a power loss of the laser pulses generated in the laser resonator. The modulation medium is a transparent, e. g. plate-like component with controllable transmission along the resonator beam path. In particular, the loss-modulator device is capable of controlling at least one of CEO and intensity of the laser pulses created in the laser resonator.

According to the invention, the Kerr medium device includes the modulation medium of the loss-modulation device as the at least one Kerr medium. The modulation medium of the loss-modulation device is arranged in a focal range of the resonator beam path for introducing a Kerr effect in the laser resonator, in particular for creating a Kerr lens in the laser resonator and providing the mode-locked operation state of the circulating laser field. Accordingly, the material of the modulation medium has a selected optical non-linearity being adapted for both of introducing the Kerr effect in the laser resonator and modulating the power loss. Preferably, the laser resonator is configured such that the beam diameter of the circulating laser field in the modulation medium of the loss-modulation device is less than the beam diameter in the gain medium, so that the nonlinearity inside the resonator is dominated by the modulation medium of the loss-modulation device which is why the Kerr effect is efficiently decoupled from the gain medium of the laser resonator.

According to a second general aspect of the invention, the above objective is solved by a method of generating laser pulses, wherein a laser device having a laser resonator with a plurality of resonator mirrors, a solid state gain medium, a Kerr medium device with at least one Kerr medium and a loss-modulator device with a modulation medium is employed. Preferably, the method is conducted with the laser device according to the invention. A circulating laser field is created in the laser resonator by pumping the gain medium. The laser pulses are generated by mode-locking the circulating laser field, wherein the laser pulses are formed by the nonlinear Kerr effect created in the at least one Kerr medium being separated from the gain medium. A power loss of the laser pulses in the laser resonator is modulated using the loss-modulator device. According to the invention, the modulation medium of the loss-modulation device is provided as the at least one Kerr medium of the Kerr medium device, and the modulation medium of the loss-modulation device is used for both of introducing a Kerr effect in the laser resonator and modulating the power loss.

According to the invention, loss-modulation, e. g. obtained from acousto-optic diffraction or polarization rotation in an electro optic modulator (in combination with a polarization selection device) and the Kerr effect are combined in one single element (single, common material) inside the laser resonator. The inventors have found that modulation media of available optical modulators have an optical non-linearity being selectable, e. g. by providing a thickness and/or material properties, like refractive index, such that the Kerr effect can be created and stable pulse mode-locking is obtained. Advantageously, this allows Kerr lens mode-locking while simultaneously supporting large modulation bandwidths of the loss-modulation device. In contrast to the approach presented in [3], the nonlinearity inside the modulation medium of the loss-modulator device is selected in a targeted manner for providing the KLM mechanism in the resonator such that the mode-locked state is stably kept during operation of the laser device. Preferably, the loss-modulation device is modulated (driven) with modulation frequencies in the range from above 0 Hz to 10 MHz. Preferably, the loss-modulation device is not used for initiating of passive mode coupling, but rather for the mode-locking by the Kerr effect. Initiating of the passive mode coupling is obtained from a resonator disturbance, like e. g. a mechanical disturbance and/or background noise.

According to the invention, the modulator medium is adapted for applying a nonlinear phase shift to the laser pulses, wherein the nonlinear phase shift is in a range between 100 mrad and 10 rad per pass through the laser resonator, in particular through the modulator medium of the loss modulation device. The phase shift is selected in dependency on the operation parameters and the amount and position of possible additional Kerr media. With this phase shift range, advantages for simultaneously using the modulator medium for intra-cavity loss modulation and for introducing a Kerr effect to facilitate Kerr lens mode-locking of the laser are obtained.

According to an advantageous, optional embodiment of the invention, the laser resonator, in particular the Kerr medium device thereof, comprises only one single Kerr medium provided by the modulator medium of the loss-modulation device. In this case, the total nonlinear phase shift $\Delta\phi_{total}$ applied to the laser pulses is introduced exclusively by the modulator medium. Advantageously, this embodiment allows the provision of an optical setup with a low number of optical components. Preferably, the modulator medium of the loss-modulation device is arranged in a focal range of the resonator beam path.

According to an alternative, optional embodiment of the invention, at least two Kerr media, i. e. at least two separate transmissive components introduce the Kerr effect in the laser resonator. The first of the at least two Kerr media is the loss-modulation device mentioned above. The second or any further of the at least two Kerr media comprises a passive Kerr medium, like a conventional Kerr medium, e. g. transparent plate, and/or a further modulation medium of a loss-modulation device. In the first case, the passive Kerr medium comprises e. g. fused silica, crystal quartz or YAG or comparable materials having a Kerr nonlinearity. The Kerr effect obtained by the modulator medium of the loss-modulation device is, in particular in this case, preferably such that $5*\Delta\phi_{mm}>\Delta\phi_{total}$, in particular if $3*\Delta\phi_{mm}>\Delta\phi_{total}$, with $\Delta\phi_{mm}$ being the nonlinear phase shift per pass through the modulator medium and $\Delta\phi_{total}$ being the total nonlinear phase-shift per within the laser resonator (significant Kerr effect). In the second case, the laser resonator includes e. g. two Kerr media provided by two modulator media of two loss-modulation devices, resp., so that the total nonlinear phase shift $\Delta\phi_{total}$ applied to the laser pulses is introduced exclusively by modulator media of loss-modulation devices. Advantageously, by providing the at least two Kerr media, pulse creation with the distributed Kerr effect can be provided (see [1]). In particular, each of the first Kerr medium and the at least one further Kerr medium provide different non-linear Kerr lens contributions to the self-amplitude modulation of the circulating light field.

Preferably, the modulation medium of the loss-modulation device and the at least one further Kerr medium can be arranged adjacent to each other in a focal range of the resonator beam path, resulting in an advantageously compact resonator design. Alternatively, the modulation medium of the loss-modulation device and the at least one further Kerr medium can be arranged in different resonator beam path sections of the laser resonator, i. e. between different pairs of resonator mirrors. This allows in an advantageous manner a positioning of the Kerr media in different focus positions of the laser resonator.

According to a preferred embodiment of the invention, the modulation medium of the loss-modulation device is arranged at a focus position within the focal range of the resonator beam path. Advantageously, this provides a maximum efficiency of the mode-locking process. In particular, the minimized beam-radius inside the modulation medium of the loss-modulation device simultaneously provides a substantial increase of the achievable modulation bandwidth as compared to the approach presented in [3]. By placing the modulation medium of the loss-modulation device in the focus, the modulation bandwidth can be enhanced by up to one order of magnitude without necessitating any additional changes to the oscillator configuration (see above criterion a)). For providing the focal range of the resonator beam path including the loss-modulation device separately from the gain medium, the laser resonator can include two focusing sections, each with a pair of curved resonators mirrors e. g. with a telescope configuration. Alternatively, when using a thin-disk gain material (see below), wherein the beam is almost collimated in the gain material, only one focusing section (focusing telescope) in the laser resonator is sufficient.

As a further advantage of the invention, different types of loss-modulation devices can be used as a Kerr medium. According to a first variant, the loss modulation device is an acousto optic modulator (AOM) device and the modulator medium is an AOM material. The AOM device comprises the AOM material arranged in the resonator beam path and a sound transducer coupled with the AOM material. The sound transducer, e. g. a piezoelectric transducer, creates sound waves in the AOM material. Depending on the sound waves, the laser light field transmitted through the AOM material is diffracted into several orders, resulting in the loss-modulation within the resonator.

The intra-cavity nonlinearity can further be adjusted by varying different AOM parameters such as the utilized AOM material and/or thickness. Thus, the AOM device preferably has at least one of the following features, which can be provided alone or in any combination.

The AOM material preferably is crystalline quartz, fused silica, germanium or tellurium dioxide, sapphire or a comparable material with AOM capability. Furthermore, the AOM material preferably has a thickness in a range from 0.5 mm to 10 mm. Thinner AOMs will hardly be accessible due to manufacturing constraints and thicker AOMs can usually be avoided by choosing AOM materials with sufficiently high nonlinear refractive index. Optimizing these parameters, optionally together with the total quantity, thickness and/or position of any additional Kerr media, facilitates introducing a suitable amount of intra-cavity nonlinearity, while at the same time sufficiently high diffraction losses can be provided by the AOM. Since the required diffraction losses for modulation of the intra-cavity power are typically extremely low due to strong amplitude to phase coupling inside the Kerr medium [3], the usage of very thin AOMs is also feasible when used in combination with additional passive Kerr media.

According to a further preferred variant, the AOM device is arranged for transmitting a 0-th order diffraction beam along the resonator beam path. Accordingly, the invention preferably does not use the diffracted beam portions (single or multiple diffraction orders) of the AOM device, but only utilizes 0-th order diffraction. Advantageously, this mitigates any potential susceptibility to beam pointing fluctuations and spatial chirp.

As mentioned before, the beam (laser field inside the laser resonator) preferably is focused into the AOM material to achieve a significant Kerr effect to facilitate stable Kerr lens mode-locked operation. As a figure of merit for the strength of the Kerr effect, the accumulated nonlinear phase-shift $\Delta\phi$ inside the Kerr medium can be used. For negligible changes of the beam radius during propagation through an optical material, the nonlinear phase shift B can be defined as $B=(2\pi \cdot n_2 \cdot I \cdot l)/\lambda$ where $n_2$ is the nonlinear refractive index, I is the peak intensity, l is the thickness of the optical material and $\lambda$ is the center wavelength. For non-negligible changes of the beam radius, the more general integral equation for calculating the B-integral that can be found e.g. in [6] should be utilized. For the oscillator presented in [3], the nonlinear phase shift introduced by the AOM is only about 10 mrad due to the large beam radius inside the AOM while the nonlinear phase shift introduced by the 1 mm thick fused silica plate that was placed in the focused beam as a Kerr medium is about 1.06 rad. In this case the nonlinear phase-shift introduced by the AOM is therefore significantly smaller than the nonlinear phase-shift introduced by the Kerr medium and the Kerr-lens contribution from the AOM material can therefore be neglected.

According to a further variant, the loss modulation device is an electro optic modulator (EOM) device and the modulator medium is an EOM material. The EOM device comprises the EOM material exhibiting the electro-optic effect and being arranged in the resonator beam path, and a field source device, like e. g. as pair of capacitor plates, coupled with the EOM material. Furthermore, the EOM device preferably is provided with at least one polarization selection device for selecting a preferred polarization state of the circulating light field. The polarization selection device is e. g. a Brewster-plate (arranged with the Brewster angle of the plate surfaces relative to the resonator beam path) and/or a thin-film polarizer and/or a component having a comparable polarization selection mechanism. However, providing the at least one polarization selection device is not necessary if the EOM material itself is arranged with the Brewster angle of the EOM material surfaces relative to the resonator beam path. In this case, the EOM material has a polarization dependent transmission, so that an additional polarization selection device can be omitted.

Depending on the parameters of the electric field created by the field source device, e. g. the amplitude, frequency and/or phase thereof, the laser light field transmitted through the EOM material changes its polarization state. In combination with the polarization selection device or by the effect of the EOM material at the Brewster angle, the loss of the laser cavity can be manipulated.

The intra-cavity nonlinearity also can be adjusted by varying EOM parameters such as the utilized EOM material and/or thickness. Thus, according to further preferred features of the invention, the EOM device has at least one of the following features, which can be provided alone or in any combination. Advantages of optimizing these features correspond to those considered above with reference to the AOM device.

The EOM material preferably is BBO, DKDP, $LiNbO_3$ or a comparable material with EOM capability. Furthermore, the EOM material preferably has a thickness in a range from 0.5 mm to 20 mm. Typically, the EOM device manipulates the polarization state of the laser pulses. Alternatively, it can be used for directly shifting the phase of the laser pulses.

The decoupling of the Kerr medium from the gain medium in different resonator beam path sections of the laser resonator results in a further advantage of the invention. The gain-medium geometry can be freely chosen, e. g. to be either bulk, slab, disk or thin-disk. According to a particularly preferred embodiment of the invention the gain medium comprises a thin-disk gain material, preferably coupled with one of the resonators mirrors.

Using the thin-disk gain material has advantages for high power applications of the invention. The improved power scalability of the inventive technique can be evaluated by considering the power scaling laws for thin-disk oscillators [7]. In these resonators, the intra-cavity peak power typically scales linearly with the beam radius of the focused beam which is dependent on the radius of curvature (ROC) of the telescope mirrors. Intra-cavity peak powers of about 410 MW have been realized with a beam radius of about 300 µm inside the Kerr medium [7]. In contrast, the beam radius in the collimated arm is typically on the order of 1 mm. Therefore, when using the loss-modulation device as a Kerr medium, a focused beam radius of 1 mm would already facilitate intra-cavity peak powers of about 1.5 GW while maintaining the same or even higher modulation bandwidths as with the loss-modulation device placed in the collimated beam inside the resonator. By reducing the optic modulator material thickness and possibly implementing additional Kerr media, such high intra-cavity peak powers might be accessible at smaller beam radii inside the loss-modulation device, allowing for even wider modulation bandwidths.

The invention is furthermore not limited to high-power oscillators. At low intra-cavity peak-powers, the beam can be tightly focused into the loss-modulation device or the implementation of additional Kerr media or usage of a loss-modulation device with increased optical modulator material thickness can compensate for the reduced intra-cavity nonlinearity. The low power limit is therefore principally given by the mode-locking- or laser threshold, whichever occurs first. This enables the use of the proposed concept in a wide range of intra-cavity powers (see above criterion b)).

According to a particularly preferred embodiment of the invention, the laser device includes a stabilization device being configured for a control and/or stabilization of the carrier-envelope-phase (CEP) and/or an intensity of the laser pulse output of the laser resonator. The stabilization device including a laser pulse sensor, like a CEP sensor or intensity sensor, which is coupled with a controllable modulator driver, in particular AOM or EOM driver. The stabilization device includes a control unit for stabilizing the CEP and/or intensity of the laser pulses by controlling the loss-modulation device in dependency on a detected parameter of the laser pulses. Accordingly, in terms of method features, the loss-modulation device is used for controlling and stabilizing the carrier envelope offset frequency and/or intensity of the laser pulses. Advantageously, the loss-modulation device, in particular an AOM or EOM device, fulfils a double function in the inventive laser device. Firstly, it is employed for mode-locking the circulating laser field, thus creating the laser pulses. Secondly, it allows a control, preferably a loop control, of pulse parameters, like CEO and/or intensity.

BRIEF DESCRIPTION OF THE DRAWINGS

Further advantages and details of preferred embodiments of the invention are described in the following with reference to the attached drawings, which show in.

DETAILED DESCRIPTION

The following description of preferred embodiments of the invention refers to the implementation of the inventive concept of providing a loss-modulating device as a Kerr medium. Details of the design of the laser resonator and the components thereof, in particular the pump mechanism, dispersion compensation and the out-coupling of laser pulses from the laser resonator are not described as they are known per se from prior art pulse lasers with a solid state gain medium. In particular, the illustrated embodiments can be modified by additional folding of the beam path and/or by dispersion compensation employing highly dispersive mirrors or glass wedges arranged in the beam path.

Figure 1:
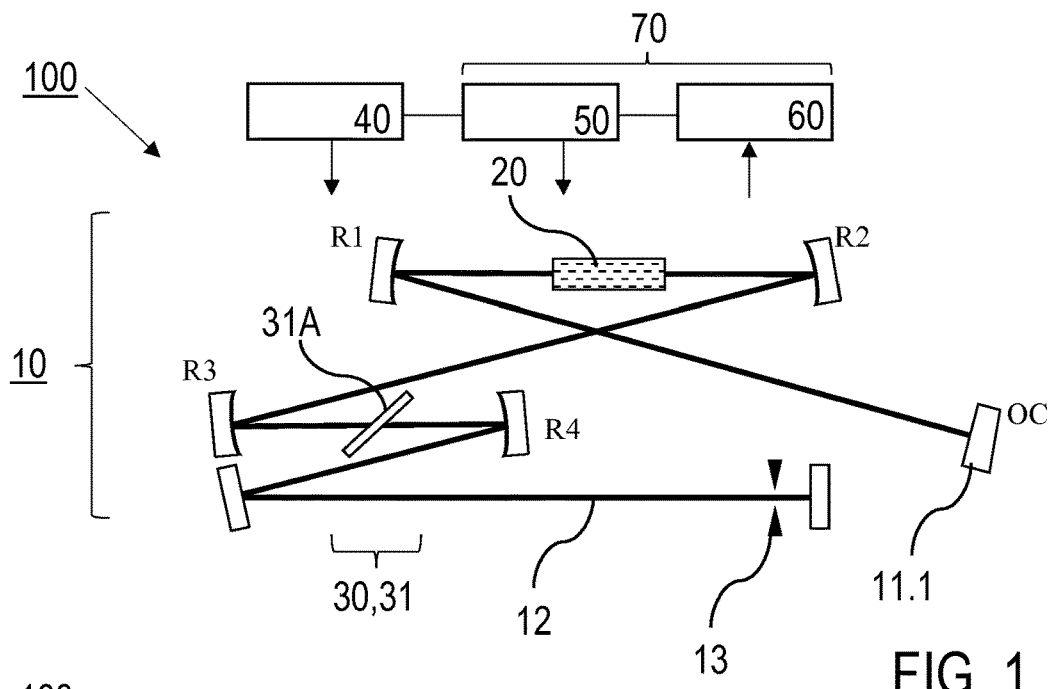
FIGS. 1 to 4: schematic overviews of laser resonators of laser devices according to preferred embodiments of the invention.

FIG. 1 shows a first embodiment of a laser device 100, wherein only one single Kerr medium is provided. The laser device 100 includes the laser resonator 10 with a gain medium 20 and a Kerr medium device 30. Further schematically illustrated components, like a pump laser 40, a control device 50 and a sensor device 60 can be coupled with the laser resonator 10 for pumping, controlling and monitoring purposes as it is known per se from conventional lasers (not shown in FIGS. 2 to 4). The control device 50 and the sensor device 60 can be combined to a carrier-envelope-phase (CEP) and/or intensity stabilization device 70, as described in an exemplary manner below with reference to FIG. 5. The laser resonator 10 comprises a plurality of dielectric resonators mirrors (e. g. 11.1) and a hard aperture 13 adjacent to one of the end mirrors. The resonator mirrors include concave mirrors R1, R2, R3 and R4 and further plane mirrors as well as a plane output coupling mirror OC. The resonators mirrors 11.1 span a resonator beam path 12 with an x-fold cavity design which is preferred for Kerr lens mode-locked lasers. The hard aperture 13 is adapted for enhancing the effect of the Kerr lens. The gain medium 20 can for instance be in bulk, e.g. made of Yb:YAG, (as shown in FIG. 1), slab or disk (see FIGS. 2 to 4) geometry.

The Kerr medium device 30 is provided by a loss-modulation device, in particular an AOM device 31 having an AOM material 31A as a modulator medium. The AOM material 31A is coupled with an AOM driver (not shown) and controlled with the control device 50. The AOM material 31A comprises e.g. a crystalline quartz plate with a thickness of 3 mm. Since the beam along the resonator beam path 12 is typically focused into the gain medium 20 by concave mirrors R1 and R2 and collimated elsewhere, a second telescope consisting of R3 and R4 is used to focus the beam into the AOM material 31A. The concave mirrors R1, R2, R3 and R4 are designed such that the beam radii fulfill $w_{AOM} < w_{Gain}$, e. g. $w_{AOM} = 30$ µm and $w_{Gain} = 90$ µm.

The laser device 100 is operated by creating a circulating laser field in the laser resonator 10, wherein the gain medium 20 is pumped with the pump laser 40. Mode-locking the circulating laser field is obtained by the nonlinear Kerr effect created in the AOM material 31A, which simultaneously is used for modulating a power loss of the laser pulses generated in the laser resonator 10.

Figure 2:
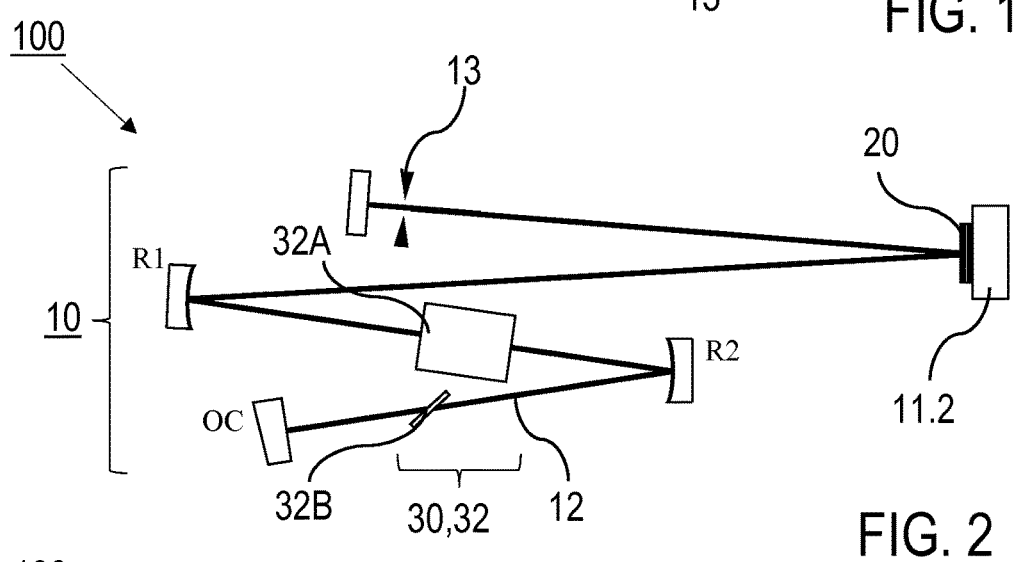

According to the invention, the modulator medium of the loss-modulation device introduces the same effect in the laser resonator as any passive Kerr medium. Therefore the invention can be implemented in a variety of resonator configurations. Thus, FIG. 2 shows a second embodiment of a laser device 100, which is adapted for high-power application, using a thin-disk based laser resonator 10. The gain medium 20 comprises a thin-disk gain medium, e. g. made of Yb:YAG coupled with a plane mirror 11.2 of the laser resonator 10. The Kerr medium device 30 is provided by another loss-modulation device, in particular an EOM device 32 having an EOM material 32A as a modulator medium (EOM driver not shown). The EOM material 32A comprises e. g. DKDP with a thickness of 5 mm, and it is arranged in a section of the laser resonator between curved resonator mirrors R1, R2, focusing the laser field into the EOM device 32. The loss-modulation device furthermore comprises a polarization selection device 32B, like e. g. a Brewster plate placed with the Brewster angle relative to the resonator beam path somewhere in the laser resonator 10, e. g. between the mirror R2 and the outcoupling mirror OC. In this type of laser resonator 10, the gain medium 20 is inherently decoupled from the Kerr medium device 30 (EOM material 32A) of the resonator. Again, a hard aperture 13 enhances the effect of the Kerr lens.

Figure 3:
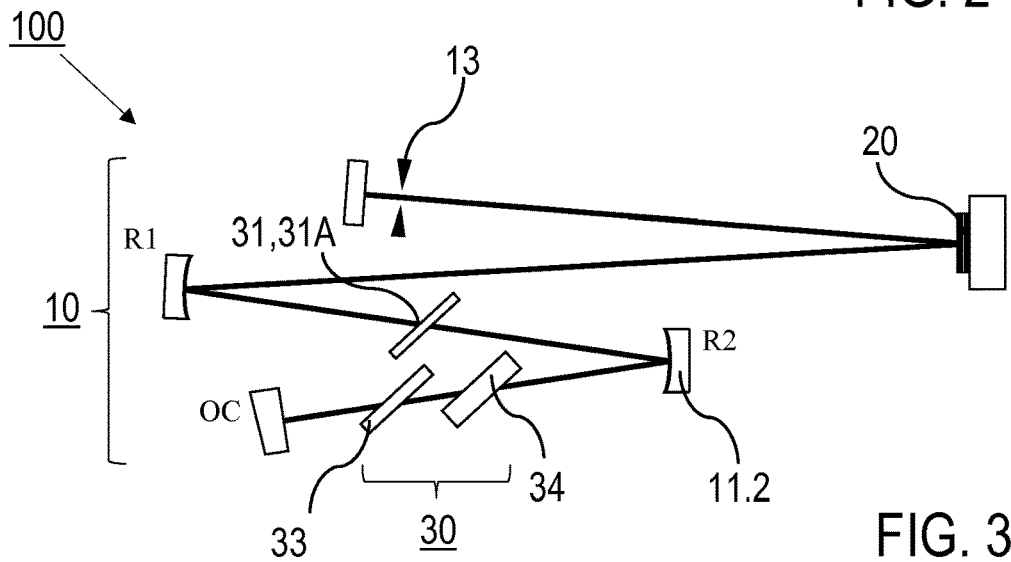

As shown in FIG. 3, the invention is also applicable to a laser device 100 with a laser resonator 10, wherein the nonlinear Kerr effect is distributed over several Kerr media (distributed Kerr lens mode-locking (DKLM), see [5]). As in FIG. 2, the gain medium 20 of the third embodiment comprises a thin-disk gain medium. The Kerr medium device 30 is provided by an AOM material 31A of an AOM device 31 (as in FIG. 2) and two Kerr media 33, 34. This allows for precise tailoring of the total intra-cavity nonlinearity and ensures applicability in a wide range of oscillator configurations. The additional two Kerr media 33, 34 are utilized to enhance the effect of self-phase and self-amplitude modulation. The beam radii inside the AOM material 31A, Kerr medium 33 and Kerr medium 34 are $w_{AOM} < w_2 < w_1$, e. g. 20 µm, 110 µm mm and 120 µm, resp. Details of the embodiment of FIG. 3 can be implemented as described in [1], which is introduced to the present specification by reference, in particular with regard to the configuration of the laser resonator with distributed Kerr lens mode-locking.

The embodiment of FIG. 3 can be modified, e. g. by using different gain-medium geometry such as bulk or slab, or by providing multiple AOM and/or EOM devices as additional Kerr media. Multiple optical modulators within the laser resonator 10 have an advantage in terms of simultaneously allowing multiple phase-locked loops for controlling the laser device 100 (see FIG. 5).

Figure 4:
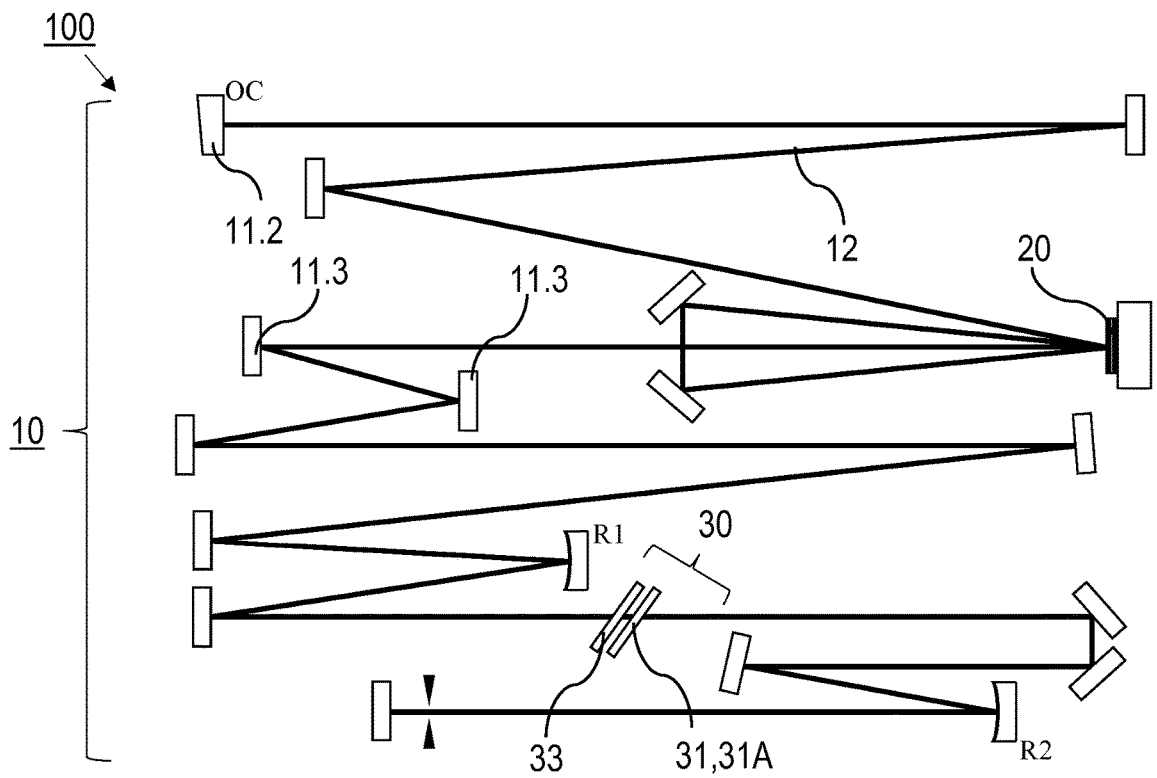

FIG. 4 shows a fourth embodiment of the inventive laser device 100, employing a second Kerr medium 33 in close vicinity of the AOM material 31A of the AOM device 31. The laser resonator 10 is configured for a double-pass of the beam path 12 over the thin-disk gain medium 20. Two highly dispersive mirrors 11.3 with −3000 fs² GDD are used for dispersion compensation. Mirrors R1 and R2 are concave focusing mirrors with a radius of curvature of 2000 mm. A 15% transmission output coupler mirror 11.2 was used. The remaining mirrors are highly reflective mirrors.

The laser device 100 of FIG. 4 is a modified version of the Kerr lens mode-locked Yb:YAG oscillator described in [7]. For the inventive device, the conventionally utilized Kerr medium (5 mm sapphire plate) was replaced by a 3 mm thick AOM material 31A made of quartz. An additional 3 mm quartz plate was placed as second Kerr medium 33 in close vicinity of the AOM material 31A to enhance both the effect of self-phase and self-amplitude modulation. Both of the AOM material 31A and the second Kerr medium 33 are arranged within a focal range of the laser resonator 10. The exact separation distance between the AOM material 31A and the Kerr medium 33 is uncritical due to the long Rayleigh length of the focused beam with approximately 300 µm radius.

The laser resonator 10 operation resulted in an emission of an average output power of 105 W, delivering 190 fs pulses with 6.7 µJ pulse energy at a repetition rate of 15.6 MHz and 1030 nm central wavelength. The reduction in output power as compared to [7] was realized by changing the Kerr medium position and was carried out in order to optimize the output pulse stability of the oscillator. Otherwise, nearly the same peak- and average power levels (60 MW, 150 W) could be reached with the presented AOM-Kerr medium combination.

Figure 5:
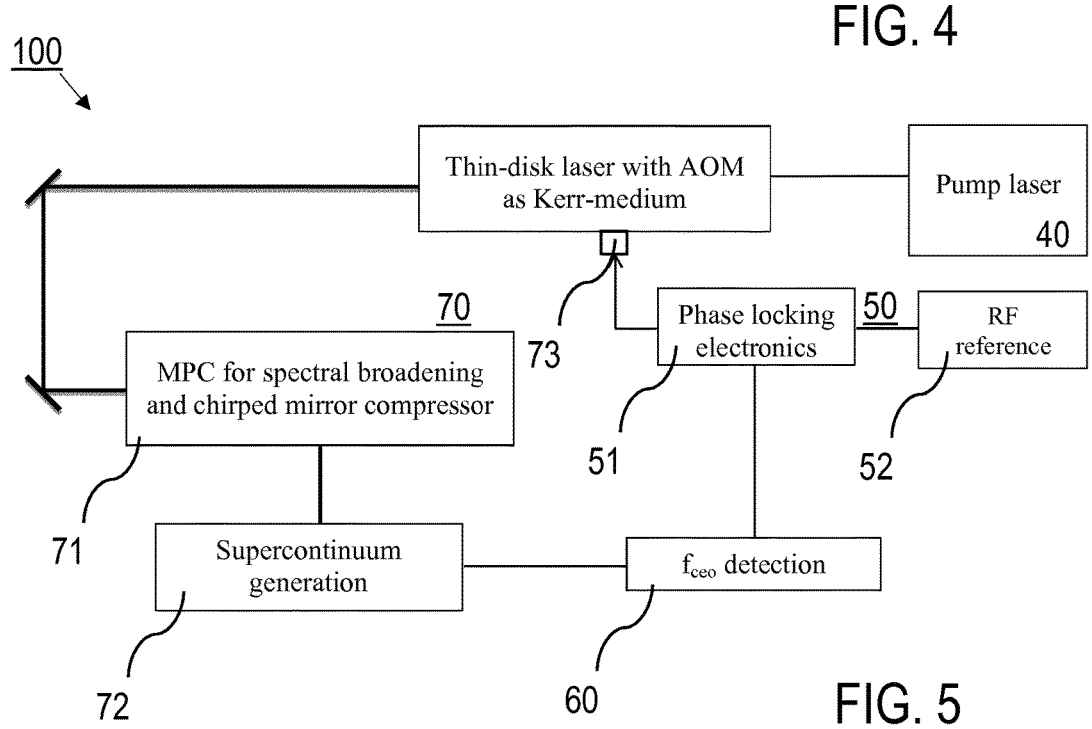
FIG. 5: a schematic illustration of a laser device including a stabilization of the CEO frequency.

A complete laser device 100, including the laser resonator 10, e. g. according to FIG. 4, and a carrier-envelope-phase (CEP) stabilization device 70 is shown FIG. 5. A pump laser 40, e. g. an InGaAs laser diode is coupled with the laser resonator 10 for pumping the gain medium thereof. The CEP stabilization device 70 comprises a pulse compressor device 71, a supercontinuum generation device 72, and an AOM driver 73 as well as a sensor device 60 and a control device 50. The pulse compressor device 71 comprises a pre-broadening stage consisting of a Herriot-type multi-pass cell (MPC) and a chirped mirror compressor. In a practical implementation, about 80 W of the laser resonator output is sent into the pulse compressor device 71 effectively reducing the pulse duration down to 40 fs and increasing the peak power to 102 MW. This has advantages for avoiding decoherence effects in the subsequent supercontinuum generation process. Approximately 130 mW of the compressed pre-broadening stage output are then used to generate a supercontinuum in the supercontinuum generation device 72, which includes a 4.5 cm long piece of highly nonlinear photonic crystal fiber (PCF, NKT Photonics SC-3.7-975). For detecting the CEO frequency, the sensor device 60 comprises f-2f-interferometer. The detection of the CEO frequency is not limited to the use of an f-to-2f interferometer, it can also be a 2f-to-3f or higher multiple interferometer, or a monolithic DFG setup [8, 9]. The control device 50 includes phase locking electronics 51 (e.g. digital phase detector Menlo DXD100, Proportional-Integral-Derivative (PID) Controller Vescent Photonics D2-125) being coupled with an RF reference source 52. The output of the phase locking electronics 51 is used for controlling the AOM device of the laser resonator 10 via the AOM driver 73.

Additionally or alternatively, intensity stabilization can be provided with an intensity stabilization device (not shown) in a corresponding manner, including an output intensity sensor and the control device. Furthermore, multiple stabilization channels can be provided if the laser resonator 10 includes multiple optical modulators (AOM and/or EOM devices).

Figure 6:
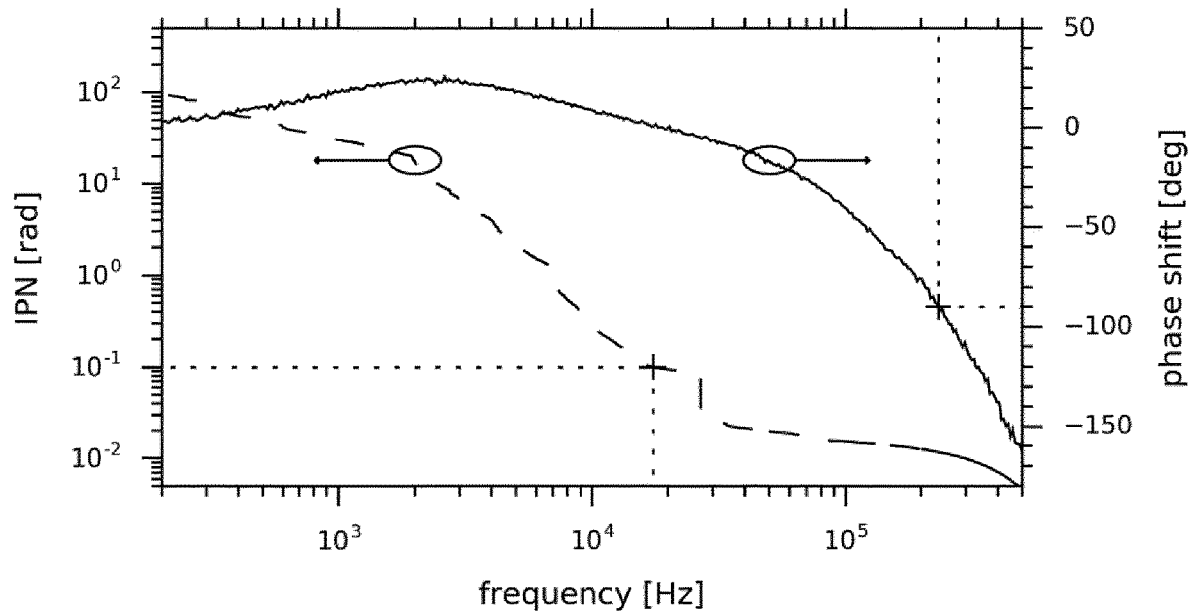
FIGS. 6 to 7: experimental results illustrating advantageous features of the inventive CEO stabilization.

FIG. 6 illustrates the phase transfer function (solid) of the AOM device 31 inside the laser resonator 10 (see e. g. FIG. 4) and phase noise of the free running laser (dashed). The dotted lines indicate the frequency where a phase lag of 90° is reached and the frequency where a phase noise of 100 mrad is accumulated, respectively. This transfer function can be obtained by measuring the output of the laser device (100) with a photodiode connected to a lock in amplifier (Zurich Instruments UHF) for characterizing the performance of the AOM material 31A when placed as a Kerr medium inside the laser resonator 10 (see e. g. FIG. 4). The phase lag of 90° is reached at about 230 kHz indicating that frequency manipulation is feasible in a wide frequency band. After alignment of the f-2f-interferometer of the sensor device 60, a beat-note can be obtained with a signal to noise ratio of 35-40 dB (measured within a 10 kHz resolution bandwidth). To assess whether the available modulation bandwidth is sufficient for the stabilization of the CEO frequency, the noise-characteristics of the free-running beat note were analyzed more closely. For this purpose, the beat-note was sampled by a fast oscilloscope at a sampling rate of 25 MHz, which allows resolving frequency components up to 12.5 MHz. The recorded traces were evaluated with the numerical method presented in [2]. Evaluation of the integrated phase noise (IPN) of the free-running CEO frequency showed that a modulation bandwidth of more than 20 kHz is required to obtain a residual phase noise level below 100 mrad (FIG. 6). This is readily provided by the utilized AOM device exceeding the desired bandwidth by a multiple.

In order to lock the CEO, a beat signal of the detected CEO frequency and the RF reference frequency is monitored. The free-running beat signal was shifted to 10.7 MHz by slightly adjusting the pump power of the pump laser 40. The CEO frequency is band-passed and amplified, e. g. by +60 dB, before being compared to an externally applied RF-frequency, e. g. 10.7 MHz, from the RF reference source 52, e. g. an Marconi 2022D Signal Generator in a ±1611 digital phase detector. The resulting error signal is split, with half the power being sent into a proportional-integral-derivative (PID) controller (Vescent Photonics D2-125) and the other half being used for monitoring the locking performance. The servo signal generated in the PID controller was then applied to the modulation input of the AOM driver 73.

Figure 7:
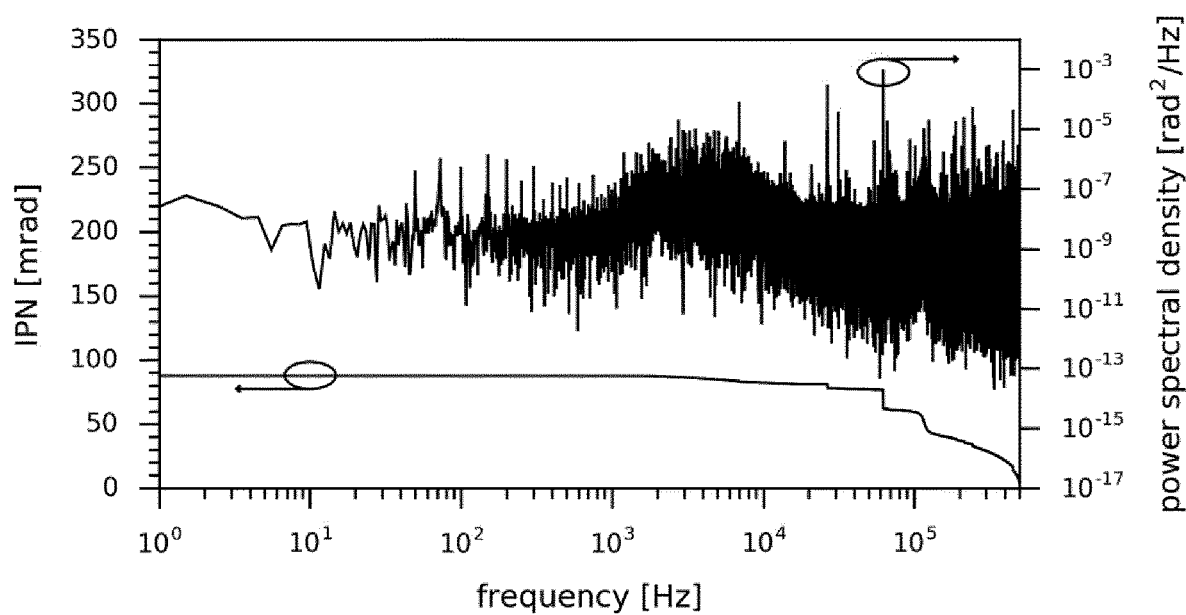

With the inventive setup, tight locking of the CEO frequency could be achieved. The power spectral density and the integrated phase noise of the locked CEO frequency are shown in FIG. 7. A residual phase noise level of 88 mrad in the bandwidth $(1-5\cdot10^5)$ Hz could be obtained.

The features of the invention disclosed in the above description, the figures and the claims can be equally significant for realizing the invention in its different embodiments, either individually or in combination or in sub-combination.

The invention claimed is:

1. Laser device being configured for generating laser pulses by Kerr lens based mode locking, comprising
    a laser resonator with a plurality of resonator mirrors spanning a resonator beam path,
    a solid state gain medium being arranged in the laser resonator,
    a Kerr medium device being arranged with a distance from the gain medium in the laser resonator, wherein the Kerr medium device includes at least one Kerr medium being arranged in a focal range of the resonator beam path and being configured for forming the laser pulses by a combination of self-focusing cause by the nonlinear Kerr effect in conjunction with one of a soft-aperture and a hard-aperture inside the laser resonator, and
    a loss-modulation device having a modulator medium, which is configured for modulating a power loss of the laser pulses generated in the laser resonator, wherein the Kerr medium device includes the modulator medium of the loss-modulation device as the at least one Kerr medium,
    the modulator medium of the loss-modulation device is configured to create a nonlinear phase shift in a range between 100 mrad and 10 rad per pass through the loss modulator medium of the loss modulation device; and the laser resonator is configured such that a beam diameter of the circulating laser field in the modulator medium of the loss-modulation device is less than the beam diameter in the gain medium, so that the nonlinearity inside the resonator is dominated by the modulator medium of the loss-modulation device, wherein the nonlinear phase shift $\Delta\Phi$ inside the modulator medium per pass through the modulator medium is at least $\Delta\Phi_{total}/3$, with $\Delta\Phi_{total}$ being a total nonlinear phase shift within the laser resonator.

2. Laser device according to claim 1, wherein the laser resonator includes only one single Kerr medium provided by the modulator medium of the loss-modulation device.

3. Laser device according to claim 1, wherein the Kerr medium device comprises at least two Kerr media, including the modulator medium of the loss-modulation device and at least one further Kerr medium, which comprises a transparent plate having a Kerr non-linearity and/or a further loss-modulation device.

4. Laser device according to claim 3, wherein the modulator medium of the loss-modulation device and the at least one further Kerr medium are arranged adjacent to each other in the focal range of the resonator beam path.

5. Laser device according to claim 3, wherein the modulator medium of the loss-modulation device and the at least one further Kerr medium are arranged in different resonator beam path sections between different pairs of resonator mirrors.

6. Laser device according to claim 1, wherein the modulator medium of the loss-modulation device is arranged at a focus position within the focal range of the resonator beam path.

7. Laser device according to claim 1, wherein the nonlinear phase shift $\Delta\Phi$ inside the modulator medium is at least $\Delta\Phi_{total}/5$, with $\Delta\Phi_{total}$ being a total nonlinear phase shift within the laser resonator.

8. Laser device according to claim 1, wherein the loss modulation device is an acousto optic modulator (AOM) device and the modulator medium is an AOM material.

9. Laser device according to claim 8, wherein the AOM device has at least one of the features:
the AOM material is crystalline quartz, fused silica, germanium or tellurium dioxide, sapphire or a comparable material with AOM capability,
the AOM material has a thickness in a range from 0.5 mm to 10 mm, and
the AOM material is arranged for transmitting a 0-th order diffraction beam along the resonator beam path.

10. Laser device according to claim 1, wherein the loss modulation device is an electro optic modulator (EOM) device and the modulator medium is an EOM material.

11. Laser device according to claim 10, wherein the EOM device has at least one of the features:
the EOM material is BBO, KDP, LiNbO$_3$ or a comparable material with EOM capability,
the EOM material has a thickness in a range from 0.5 mm to 20 mm,
the EOM device is able to manipulate the polarization state of the laser pulses and the EOM material is arranged with the Brewster angle relative to the resonator beam path, and the EOM device is able to manipulate the polarization state of the laser pulses and the EOM device further includes at least one polarization selection device.

12. Laser device according to claim 1, wherein the gain medium comprises a thin-disk gain material.

13. Laser device according to claim 1, further comprising a carrier-envelope-phase (CEP) and/or intensity stabilization device including a laser pulse detector and an acousto optic modulator (AOM) or electro optic modulator (EOM) driver, wherein the stabilization device is arranged for stabilizing the CEP and/or intensity of the laser pulses by controlling the loss-modulation device in dependency on a detected parameter of the laser pulses.

14. Method of generating laser pulses by Kerr lens based mode locking with a laser device having a laser resonator with a plurality of resonator mirrors spanning a resonator beam path, a solid state gain medium, a Kerr medium device with at least one Kerr medium being arranged with a distance from the gain medium in a focal range of the resonator beam path, and a loss-modulator device having a modulator medium, including the steps of creating a circulating laser field in the laser resonator by pumping the gain medium, generating the laser pulses by mode-locking the circulating laser field, wherein the laser pulses are formed by a combination of self-focusing cause by the nonlinear Kerr effect created in the at least one Kerr medium in conjunction with one of a soft-aperture and a hard-aperture inside the laser resonator, and modulating a power loss of the laser pulses generated in the laser resonator using the loss-modulator device, wherein the Kerr medium device includes the modulator medium of the loss-modulation device as the at least one Kerr medium, and the modulator medium of the loss-modulation device creates a nonlinear phase shift in a range between 100 mrad and 10 rad per pass through the loss modulator medium of the loss modulation device; and the laser resonator is configured such that a beam diameter of the circulating laser field in the modulator medium of the loss-modulation device is less than the beam diameter in the gain medium, so that the nonlinearity inside the resonator is dominated by the modulator medium of the loss-modulation device, the nonlinear phase shift $\Delta\Phi$ inside the modulator medium per pass through the modulator medium is at least $\Delta\Phi_{total}/3$, with $\Delta\Phi_{total}$ being a total nonlinear phase shift within the laser resonator.

15. Method according to claim 14, wherein the loss-modulation device is used for controlling and stabilizing the carrier envelope offset frequency and/or intensity of the laser pulses.

16. Method according to claim 15, wherein the modulator medium of the loss-modulation device creates a nonlinear phase shift in a range between 100 mrad and 10 rad per pass through the loss modulator medium of the loss modulation device.

17. Method according to claim 14, wherein the loss-modulation device includes an acousto optic modulator (AOM) device and/or an electro optic modulator (EOM) device.

18. Method according to claim 17, wherein
the modulator medium of the loss-modulation device creates a nonlinear phase shift in a range between 100 mrad and 10 rad per pass through the loss modulator medium of the loss modulation device.

19. Method according to claim 14, wherein
the laser resonator includes only one single Kerr medium provided by the modulator medium of the loss-modulation device.

20. Method according to claim 14, wherein
the Kerr medium device comprises at least two Kerr media, including the modulator medium of the loss-modulation device and at least one further Kerr medium, which comprises a transparent plate having a Kerr non-linearity and/or a further loss-modulation device.

21. Method according to claim 20, wherein
the modulator medium of the loss-modulation device and the at least one further Kerr medium are arranged adjacent to each other in the focal range of the resonator beam path.

22. Method according to claim 20, wherein
the modulator medium of the loss-modulation device and the at least one further Kerr medium are arranged in different resonator beam path sections between different pairs of resonator mirrors.

23. Method according to claim 14, wherein
the modulator medium of the loss-modulation device is arranged at a focus position within the focal range of the resonator beam path.

24. Method according to claim 14, wherein
the loss modulation device is an acousto optic modulator (AOM) device and the modulator medium is an AOM material, and
the AOM material transmits a 0-th order diffraction beam along the resonator beam path.

25. Method according to claim 14, wherein
the loss modulation device is an electro optic modulator (EOM) device and the modulator medium is an EOM material,
the EOM device manipulates the polarization state of the laser pulses, and
the EOM material is arranged with the Brewster angle relative to the resonator beam path and/or the EOM device further includes at least one polarization selection device.

26. Method according to claim 14,
the gain medium comprises a thin-disk gain material.

27. Laser device according to claim 14, wherein
the nonlinear phase shift $\Delta\Phi$ inside the modulator medium is at least $\Delta\Phi_{total}/5$, with $\Delta\Phi_{total}$ being a total nonlinear phase shift within the laser resonator.

* * * * *